UNITED STATES PATENT OFFICE.

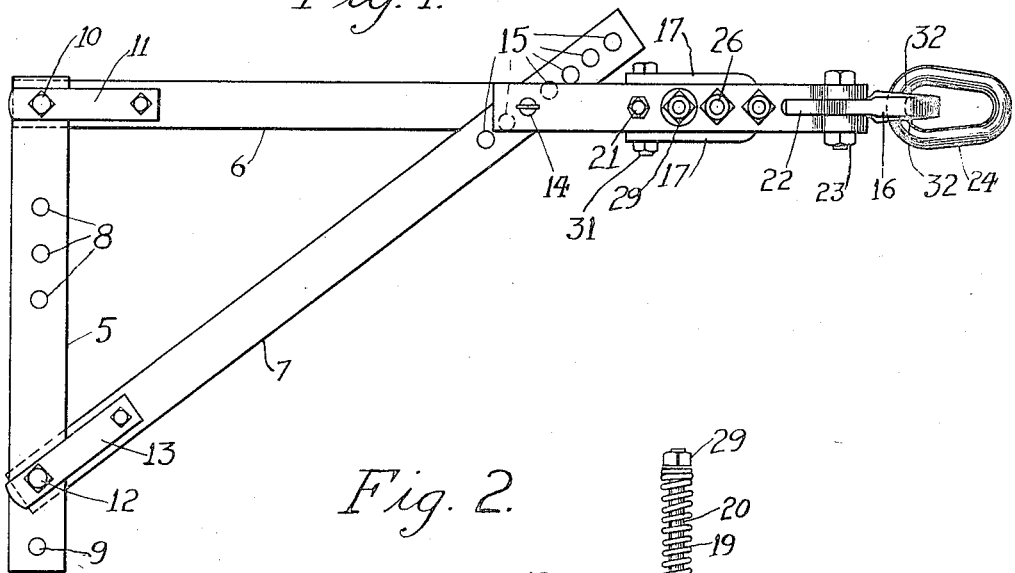
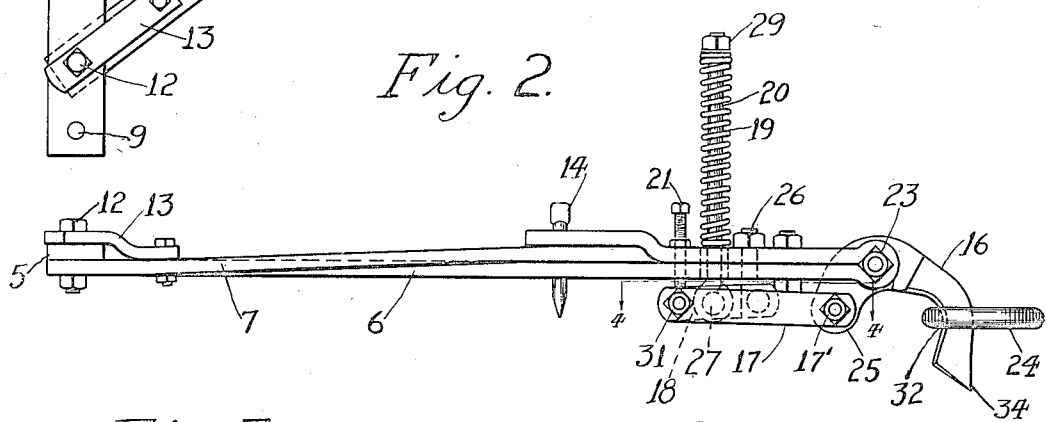
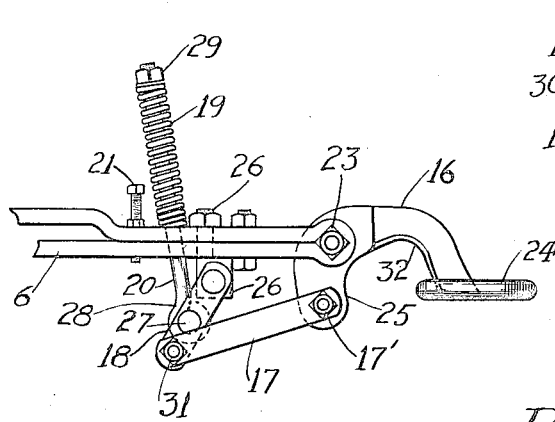
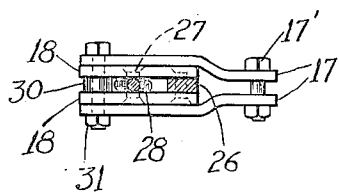

ROY B. JOHNSTON, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY.

RELEASE HITCH.

1,419,265.        Specification of Letters Patent.    Patented June 13, 1922.

Application filed December 8, 1920. Serial No. 429,099.

*To all whom it may concern:*

Be it known that I, ROY B. JOHNSTON, a citizen of the United States, residing at Hamilton, in the county of Wentworth, Province of Ontario, Dominion of Canada, have invented certain new and useful Improvements in Release Hitches, of which the following is a full, clear, and exact specification.

My invention relates to tractor hitches, and more particularly to a release hitch for yieldably connecting a tractor to an implement such as a plow or the like.

When plows are pulled by tractors it is necessary to provide a connection or hitch between the two that will release the tractor when the plow strikes a stone, stump or other obstacle in the field to prevent breaking or other injury to the plow. This has heretofore been accomplished by various means, chief among which are hitches having wooden break pins that shear when the pull becomes too great and spring or trip hitches that open and release the tractor before breakage of the plow occurs. While these forms have proven very effective in preventing damage to the plow, they are not satisfactory because of the time lost and difficulty experienced in again hitching the tractor to the plow. In the case of break pins, it is necessary to remove the parts of the broken pin, back up the tractor, reassemble the hitch and insert a new pin, a task difficult of accomplishment by the operator of the tractor alone, and at best requiring him to dismount from the tractor two or more times. There is a further objection to break pins in that the wear caused by the slight movement of the coupled parts of the hitch and the pull on the pin reduces its cross-section, and finally causes it to break or shear when the plow is working in uniform ground. The trip hitches have proven more satisfactory than those having break pins in that it is easier to again connect the plow and tractor, but they have the characteristic objection that the operator must dismount from the tractor to reset the trip on the hitch. These hitches are also objectionable in that they frequently trip or release the tractor while plowing in hard ground or heavy soil when the plow has not encountered an obstruction.

My improved hitch is designed and constructed to overcome the difficulties and inconveniences noted above, and has for its principal object to provide a resilient connection between a tractor and plow whereby the shock will be cushioned and the plow released when a heavy obstruction is struck.

Another object is to provide a release hitch which will automatically return to coupling position on release of the plow.

A further object is to provide a tractor release hitch that can be coupled to the tractor draw-bar by the operator without dismounting from the tractor.

The above and other objects will be apparent to those skilled in the art, and are attained in the embodiment of my invention hereinafter described and illustrated in the accompanying drawings in which—

Figure 1 is a plan view of my release hitch;

Fig. 2 is a side elevation showing the draft hook in normal or engaging position;

Fig. 3 is a fragmentary side elevation showing the position of the hook and associated parts at the instant of release;

Fig. 4 is a section taken on the line 4—4, Fig. 2, the hook being omitted.

Referring to Fig. 1, I have shown my invention embodied in a release hitch having a triangular frame, comprising a cross hitch bar 5, a longitudinal draw-bar 6 and a diagonal bar 7. The cross-hitch bar has a plurality of apertures 8, 9 adapted to receive the clevis pins of a plow or other implement. The longitudinal draw bar 6 is pivotally connected by bolt 10 and link 11 at its rear end to one end of the cross-bar and at its forward end is doubled back to provide means for attachment of the draft hook and release mechanism and to permit adjustment with respect to the diagonal bar 7, as will presently be described. The diagonal bar 7 is connected at one end to the opposite end of the cross-bar 5 by bolt 12 and link 13, and at the other end is secured to the bar 6 by the adjusting pin 14. The bar 7 is slidable between the main part of the bar 6 and its backwardly bent end, as best shown in Fig. 2, and is provided with holes 15 adapted to receive pin 14 for lateral adjustment of the hitch.

The adjustable release mechanism of my hitch is carried by the forward end of the draw-bar 6 and comprises the draft hook 16, pairs of links 17 and 18, trip spring 19, trip spring rod 20, and adjusting screw 21.

The draft hook is pivotally mounted in a slot 22 in the forward end of bar 6 on a pivot pin or bolt 23 and receives the draft link or ring 24 which is secured to the draw-bar of the tractor, not shown. The hook has a depending arm 25 to which the long pivot links 17 are connected at one end by bolt 17', the other ends being pivoted to the short pivot links 18. The other ends of the links 18 are pivoted to the stud or bolt 26 carried by the bar 6. The links 18 are connected intermediate their ends to the trip spring rod 20 by a pivot pin 27 passing through the eye 28 of the rod. The rod extends upwardly through a slot in the bar 6 and through the trip spring 19, the tension of which may be varied by the nut 29 on the upper end of the rod. The hook 16, links 17, 18, spring 19 and rod 20 constitute a toggle joint or connection for yieldably connecting the tractor and implement. The load required to trip the toggle may be varied by changing the tension in the spring 19 or by adjusting the set screw 21 which limits the closing movement of the toggle. This set screw contacts with a collar or spacer 30 on the bolt 31 connecting the links 17 and 18. Adjusting this screw causes the center line of the bolts 17', 31 (or what is the same thing, the line of draft) to fall a greater or less distance below the center line of the pivotal connection of the links 18 to the stud 26. The greater this distance the smaller will be the force or pull required to release the tractor, and conversely, the less the distance the greater will be the required pull, while if the center lines should coincide, the toggle would be on dead center and would no longer be releasable, but form a positive connection.

The draft hook 16 is thickened at the throat where it is engaged by the ring 24, as shown at 32 in Fig. 1, to provide a wide bearing for the ring and reduce the wear on the hook. The bill of the hook is slightly flattened and its forward side is inclined toward the front, when the hook is in operative position, as shown at 34 in Fig. 2. This forward inclination of the front face of the hook prevents its disengagement from the ring 24 when the tractor is backed, and is a very important feature of my invention. If the front face of the hook were curved or inclined toward the rear, it would provide a cam surface that would ride up on the ring 24 and raise the hook 16 from engagement with the ring when the tractor was backed. But with the face inclined forwardly, the effect of backing is to cause the ring to ride up higher on the hook 16 or to depress the latter and prevent disengagement.

Assuming the parts to be in the position shown in Fig. 2, which is their normal position, and the tractor attached to the ring 24, the plow or other implement will be drawn along until an obstruction is encountered that will stop it. The operator of the tractor may not be aware of the obstruction immediately or soon enough to stop the tractor before damage to the implement results, but my release hitch now comes into operation to save the implement by releasing the tractor. The increased pull of the tractor due to stopping of the plow causes the toggle connection to open and the draft hook 16 to swing upwardly so that the ring 24 will slide off and release the tractor as shown in Fig. 3. As soon as the tractor is released, the spring 19 returns the toggle and draft hook to operative position, ready to be attached to the tractor again. When the hitch is released from the tractor, the forward end carrying the hook 16 will drop to the ground somewhat below the tractor draw bar. In order that the hook 16 may be re-engaged in the ring 24, I attach one end of a light rope or chain to the hitch adjacent the hook and secure the other end close to the operator of the tractor. When the plow is released from the obstruction, the operator backs the tractor and at the same time lifts the front end of the hitch by means of the rope and lowers the hook 16 into the ring 24 without leaving his seat, and is then ready to resume his work.

Having described one embodiment of my invention, what I claim as new and desire to secure by Letters Patent is:

1. In a release hitch, the combination of a draw-bar adapted for connection to an implement at one end, a draft hook pivotally connected to the other end, an arm carried by the hook, a link pivoted at one end to the arm, a second link pivoted at opposite ends to the first named link and draw-bar respectively, and resilient means engaging the draw-bar and connected to the second link intermediate its ends.

2. In a release hitch, the combination of a draw-bar, a draft hook pivotally connected thereto, a toggle joint pivotally connected at one end to the draw-bar and at its other end to the hook, resilient means tending to close the toggle, and adjustable means for limiting the closing movement of the toggle.

3. Release mechanism for a tractor hitch comprising in combination a draw-bar, a hook pivotally connected to the bar, an arm carried by the hook, a stud carried by the draw bar, a toggle joint pivotally connected to the arm and stud, means tending to close the toggle, and adjustable means for limiting the closing movement.

4. Release mechanism for a tractor hitch comprising in combination a draw-bar, a draft hook pivoted thereto, a spring controlled toggle connected to the draw-bar and hook, a draft ring engaging the throat of the hook and adapted for connection to a tractor, and a forwardly extending portion on the bill of the hook adapted to prevent disengagement of the ring from the hook.

5. A release hitch for tractors comprising a draw-bar, a draft hook pivoted thereto, an arm depending from the pivot point of the hook, adjustable release mechanism connected to the arm and draw-bar, a bill carried by the forward end of the hook, a draft ring engaging the bill, and a forwardly extending cam on the bill to prevent disengagement of the ring.

6. A draft hook for a release hitch comprising a horizontal body portion, a depending arm at one end, a depending bill at the other end, the throat of the bill being thickened to provide a wide bearing for a draft ring, and the forward side of the bill projecting forwardly to prevent disengagement of the ring.

In testimony whereof I affix my signature.

ROY B. JOHNSTON.

Witnessed by—
ARTHUR A. SCARLETT,
J. OCHONSID.